US012667963B2

(12) United States Patent
  Ahire et al.

(10) Patent No.: US 12,667,963 B2
(45) Date of Patent: *Jun. 30, 2026

(54) SYSTEM AND METHOD FOR AUTONOMOUS APPLICATION OF A COATING TO A WORKPIECE

(71) Applicant: GrayMatter Robotics Inc., Gardena, CA (US)

(72) Inventors: Avadhoot L. Ahire, Gardena, CA (US); Miguel A. Chavez-Garcia, Long Beach, CA (US); Satyandra K. Gupta, Los Angeles, CA (US); Ariyan M. Kabir, Los Angeles, CA (US); Ashish Kulkarni, Long Beach, CA (US); Ceasar G. Navarro, Los Angeles, CA (US); Sagarkumar J. Panchal, Los Angeles, CA (US); Martin G. Philo, Long Beach, CA (US); Christian A. Salinas, Los Angeles, CA (US); Brual C. Shah, San Pedro, CA (US); Achille Verheye, La Jolla, CA (US); Jeano J. Vincent, Los Angeles, CA (US); Murilo M. Zelic, Long Beach, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,773

(22) Filed: Jun. 28, 2024

(65) Prior Publication Data

US 2024/0351202 A1    Oct. 24, 2024

Related U.S. Application Data

(63) Continuation of application No. 18/410,557, filed on Jan. 11, 2024, now Pat. No. 12,059,808, which is a (Continued)

(51) Int. Cl.
  *B24B 51/00* (2006.01)
  *B05B 12/12* (2006.01)
  (Continued)

(52) U.S. Cl.
  CPC ............. *B25J 9/1653* (2013.01); *B05B 12/12* (2013.01); *B05B 13/0431* (2013.01);
  (Continued)

(58) Field of Classification Search
  CPC ........ B25J 9/1653; B25J 9/163; B25J 9/1664; B25J 9/1679; B25J 9/1697; B25J 11/0065;
  (Continued)

(56) References Cited

U.S. PATENT DOCUMENTS

| | | | |
|---|---|---|---|
| 11,415,260 B2 * | 8/2022 | Hajri ..................... | G01N 27/82 |
| 2023/0008500 A1 * | 1/2023 | Iida ..................... | B05B 12/084 |

(Continued)

*Primary Examiner* — Robert T Nguyen
(74) *Attorney, Agent, or Firm* — Run8 Patent Group, LLC; Peter Miller

(57) ABSTRACT

A method includes: accessing a coating thickness range for workpiece coating; triggering an optical sensor to capture scan data representing the workpiece; triggering a depth sensor to capture a first depth value; assembling the scan data into a first virtual model representing the workpiece; defining first spray parameters corresponding to a minimum coating thickness; defining a first toolpath; driving a coating applicator along the first toolpath to spray the coating onto the workpiece; triggering the depth sensor to capture a second depth value; calculating a first coating thickness based on the first depth value and the second depth value; in response to the first coating thickness falling below the target minimum coating thickness defining a second set of spray parameters and a second toolpath; and driving the coating applicator along the second toolpath to spray the coating onto the workpiece according to the second set of spray parameters.

20 Claims, 5 Drawing Sheets

Related U.S. Application Data continuation-in-part of application No. 18/389,166, filed on Nov. 13, 2023, now Pat. No. 12,109,703, which is a continuation-in-part of application No. 18/232,275, filed on Aug. 9, 2023, now Pat. No. 11,883,961, which is a continuation-in-part of application No. 18/142,480, filed on May 2, 2023, now Pat. No. 11,938,632, and a continuation-in-part of application No. 18/136,244, filed on Apr. 18, 2023, now Pat. No. 11,820,018, and a continuation-in-part of application No. 18/111,470, filed on Feb. 17, 2023, now Pat. No. 12,049,009, which is a continuation-in-part of application No. 17/829,193, filed on May 31, 2022, now Pat. No. 11,613,014, which is a continuation of application No. 17/826,840, filed on May 27, 2022, now Pat. No. 12,370,681.

(51) Int. Cl.

| | |
|---|---|
| *B05B 13/04* | (2006.01) |
| *B05C 5/02* | (2006.01) |
| *B05D 1/28* | (2006.01) |
| *B25J 9/16* | (2006.01) |
| *B25J 11/00* | (2006.01) |
| *B25J 13/08* | (2006.01) |
| *G06T 1/00* | (2006.01) |
| *G06T 7/13* | (2017.01) |
| *G06T 7/60* | (2017.01) |
| *G06T 19/00* | (2011.01) |

(52) U.S. Cl.

CPC .......... *B05B 13/0442* (2013.01); *B05C 5/027* (2013.01); *B05D 1/28* (2013.01); *B24B 51/00* (2013.01); *B25J 9/163* (2013.01); *B25J 9/1664* (2013.01); *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search

CPC ....... B25J 13/085; B25J 9/1633; B24B 51/00; B24B 49/12; B24B 49/16; B24B 27/0038; G06T 1/0014; G06T 7/13; G06T 7/60; G06T 19/00; G06T 2207/10024; G06T 2219/004; B05B 12/084; B05B 12/122; B05B 13/0431; B05D 1/02; B64C 1/00; G01B 11/24; G01B 11/0616; G05B 2219/40586; G05B 2219/40607; G05B 2219/45082; B64F 5/10

See application file for complete search history.

(56) References Cited

U.S. PATENT DOCUMENTS

| | | | | |
|---|---|---|---|---|
| 2023/0372957 | A1* | 11/2023 | Jose | .................. G01B 11/0658 |
| 2023/0372968 | A1* | 11/2023 | Hegeman | ............. G06T 7/0004 |
| 2024/0181636 | A1* | 6/2024 | Ahire | .................. B24B 27/0038 |
| 2024/0351202 | A1* | 10/2024 | Ahire | .................. G06T 1/0014 |

* cited by examiner

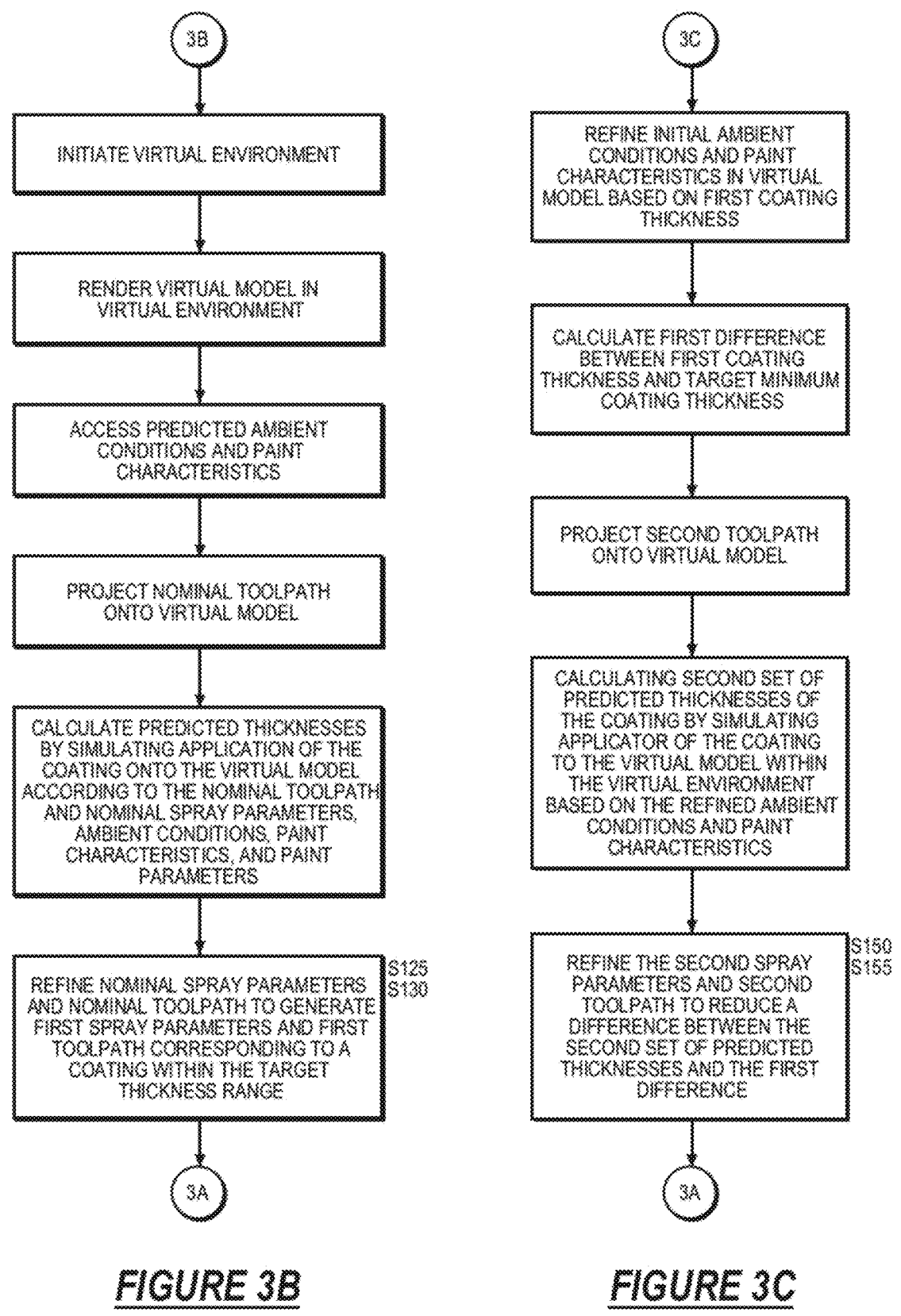
FIGURE 3B          FIGURE 3C

SYSTEM AND METHOD FOR AUTONOMOUS APPLICATION OF A COATING TO A WORKPIECE

CROSS-REFERENCE TO RELATED APPLICATIONS

This Application is a continuation of U.S. application Ser. No. 18/410,557, filed on 11 Jan. 2024, which is a continuation-in-part of U.S. application Ser. No. 18/389,166, filed on 13 Nov. 2023, which is a continuation-in-part of U.S. application Ser. No. 18/232,275, filed on 9 Aug. 2023, which is a continuation-in-part of U.S. application Ser. No. 18/111,470, filed on 17 Feb. 2023, Ser. No. 18/136,244, filed on 18 Apr. 2023, and Ser. No. 18/142,480, filed on 2 May 2023, each of which is a continuation-in-part of U.S. application Ser. No. 17/829,193, filed on 31 May 2022, which is a continuation of U.S. application Ser. No. 17/826,840, filed on 27 May 2022, each of which is incorporated in its entirety by this reference.

This Application is related to U.S. application Ser. No. 18/126,941, 27 Mar. 2023, which is incorporated in its entirety by this reference.

TECHNICAL FIELD

This invention relates generally to the field of autonomous coating of workpieces and more specifically to a new and useful method for autonomously generating and executing a toolpath to deposit a coating onto the workpiece.

BRIEF DESCRIPTION OF THE FIGURES

FIG. 3B is a representation of one variation of the method;
and
FIG. 3C is a representation of one variation of the method.

DESCRIPTION OF THE EMBODIMENTS

Figure 1A:
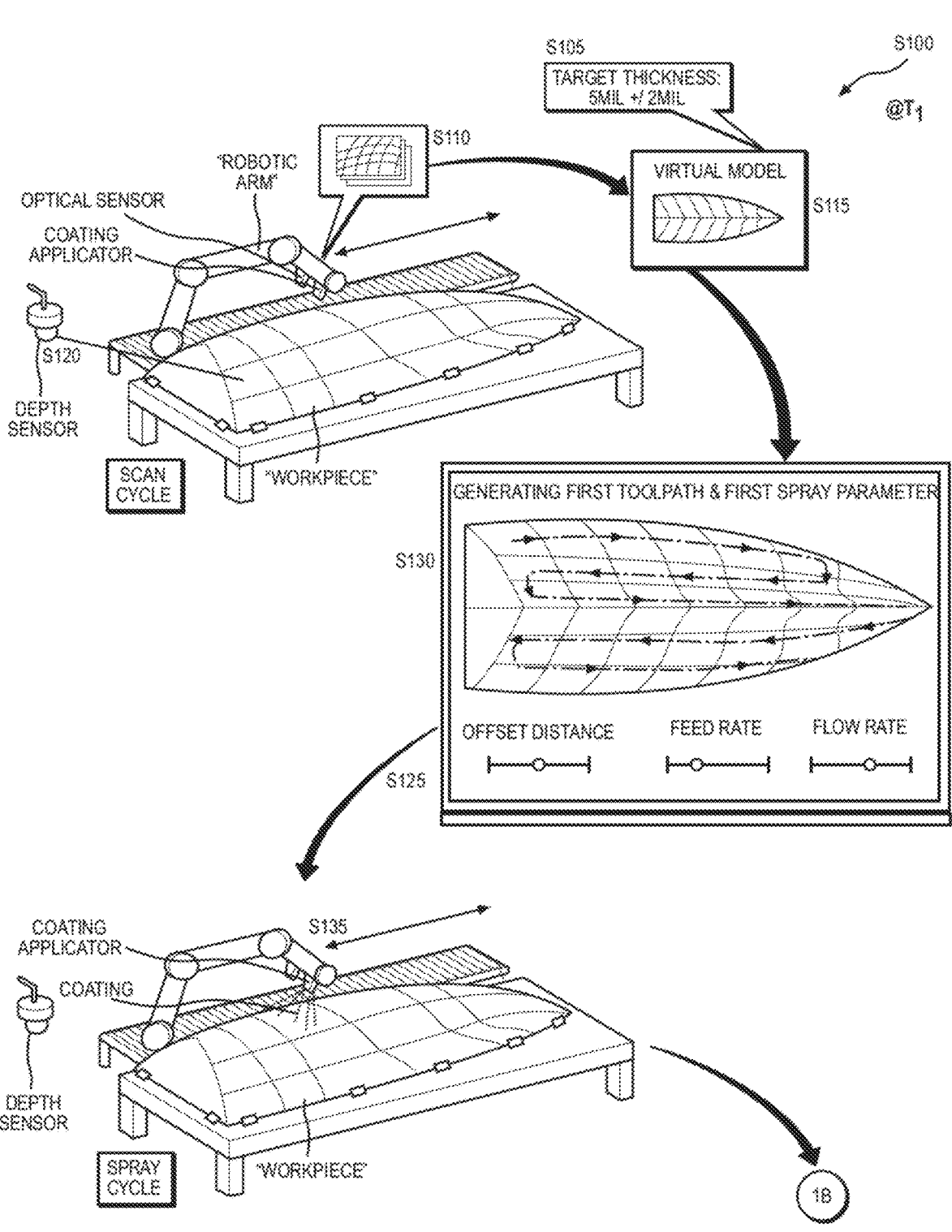
FIG. 1A is a representation of one variation of the method.
Figure 1B:
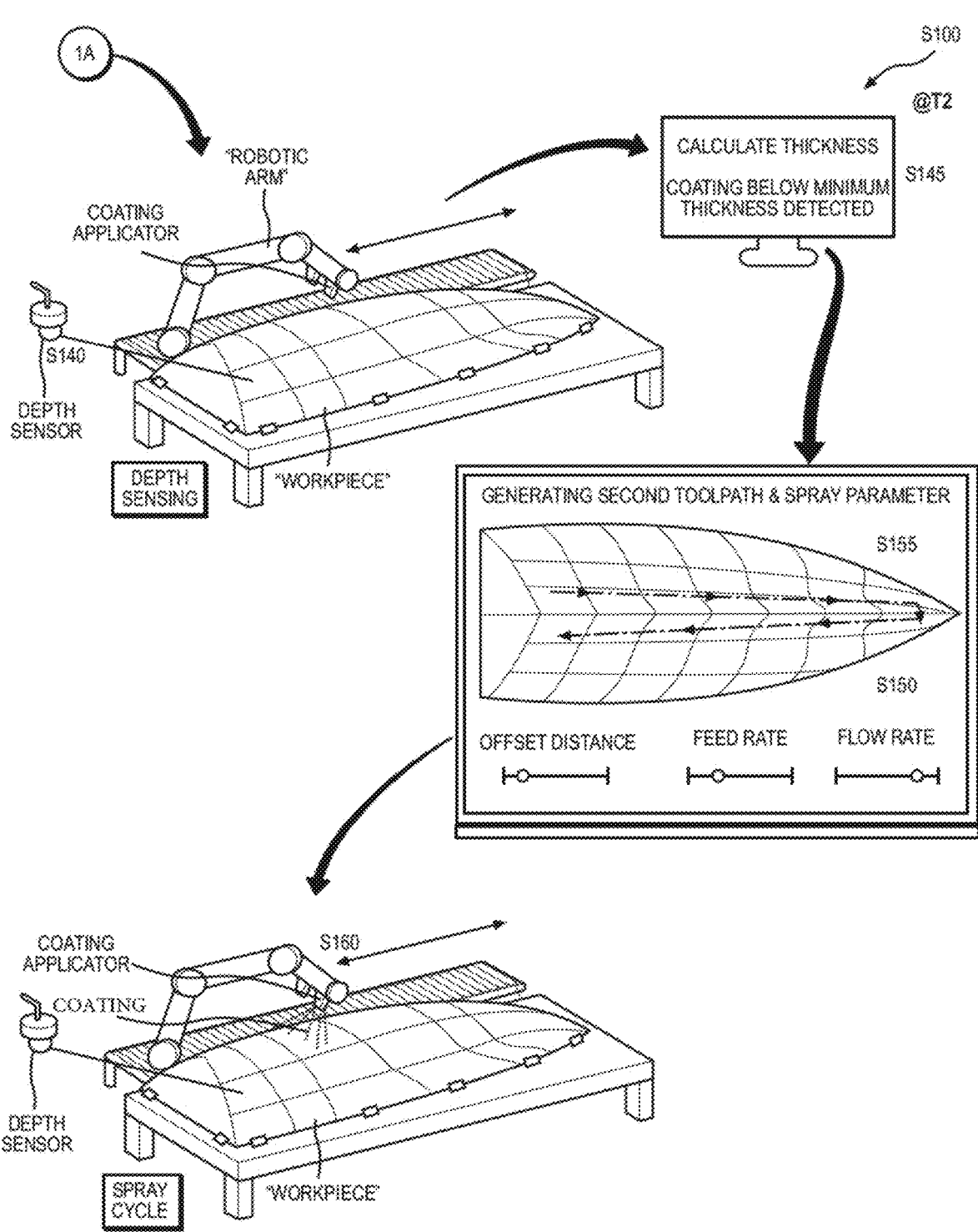
FIG. 1B is a representation of one variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

As shown in FIGS. 1A, 1B, 2, and 3A, a method S100 for autonomously applying a coating to a workpiece includes, during a first time interval: accessing a target minimum coating thickness and a target maximum coating thickness for a coating applied to a workpiece in Block S105; triggering an optical sensor, traversing a workpiece, to capture a first set of scan data representing the workpiece in Block S110; assembling the first set of scan data into a first virtual model representing a surface contour of the workpiece in Block S115; triggering a depth sensor to capture a first depth value at a first target location on the workpiece in Block S120; defining a first set of spray parameters corresponding to a first applied coating thickness biased toward the target minimum coating thickness in Block S125; defining a first toolpath based on the first set of spray parameters and the surface contour of the workpiece represented in the virtual model in Block S130; and driving a set of actuators to traverse a coating applicator along the first toolpath to spray the coating onto the workpiece according to the first set of spray parameters in Block S135.

The method S100 further includes, during a second time interval succeeding the first time interval: triggering the depth sensor to capture a second depth value at the first target location in Block S140; for a first region, calculating a first coating thickness within the first region of the workpiece based on the first depth value and the second depth value in Block S145; in response to the first coating thickness falling below the target minimum coating thickness, defining a second set of spray parameters corresponding to a second applied coating thickness biased toward the target minimum coating thickness exceeding a first difference between the first coating thickness and the target minimum coating thickness, and falling below a second difference between the first coating thickness and the target maximum coating thickness in Block S150; defining a second toolpath spanning the first region of the workpiece based on the second set of spray parameters in Block S155; and driving the set of actuators to traverse the coating applicator along the second toolpath to spray the coating onto the first region of the workpiece according to the second set of spray parameters in Block S160.

1.1 Variation: Ambient Conditions and Coating Characteristics

One variation of the method S100 includes, as shown in FIGS. 3B and 3C, during the first time interval: accessing a target minimum coating thickness and a target maximum coating thickness for a coating applied to a workpiece in Block S105; triggering an optical sensor, traversing a workpiece, to capture a first set of scan data representing the workpiece in Block S110; triggering a depth sensor to capture a first depth value at a first target location on the workpiece in Block S120; assembling the first set of scan data into a first virtual model representing a surface contour of the workpiece in Block S115; defining a first set of spray parameters corresponding to a first applied coating thickness biased toward the target minimum coating thickness based on initial ambient conditions within a work zone containing the workpiece and predicted coating characteristics in Block S125; defining a first toolpath based on the surface contour of the workpiece represented in the virtual model, the initial ambient conditions within the work zone containing the workpiece, and the predicted coating characteristics in Block S130; and driving a set of actuators to traverse a coating applicator along the first toolpath to spray the coating onto the workpiece according to the first set of spray parameters in Block S135.

This variation of the method S100 further includes, during a second time interval succeeding the first time interval: triggering the depth sensor to capture a second depth value at the first target location in Block S140; for a first region of the workpiece, calculating a first coating thickness within the first region of the workpiece based on the first depth value and the second depth value in Block S145; in response to the first coating thickness falling below the target minimum coating thickness, defining a second set of spray parameters based on revised ambient conditions within the work zone and revised coating characteristics, the second set of spray parameters corresponding to a second applied coating thickness biased toward the target minimum coating thickness exceeding a first difference between the first coating thickness and the target minimum coating thickness in Block S150; defining a second toolpath spanning the first region of the workpiece based on the revised ambient conditions within the work zone and the revised coating characteristics in Block S155; and driving the set of actuators to traverse the coating applicator along the second toolpath to spray the coating onto the first region of the workpiece according to the second set of spray parameters in Block S160.

1.2 Variation: Keep-Out Region

In another variation, the method S100 includes, during a first time interval: accessing a target minimum coating thickness and a target maximum coating thickness for a coating applied to a workpiece in Block S105; triggering an optical sensor, traversing a workpiece, to capture a first set of scan data representing the workpiece in Block S110; assembling the first set of scan data into a first virtual model representing a surface contour of the workpiece in Block S115; triggering a depth sensor to capture a first set of depth values at a set of defined target locations on the workpiece in Block S120; defining a first set of spray parameters corresponding to a first applied coating thickness biased toward the target minimum coating thickness in Block S125; defining a first toolpath based on the first set of spray parameters and the surface contour of the workpiece represented in the virtual model in Block S130; and driving a set of actuators to traverse a coating applicator along the first toolpath to spray the coating onto the workpiece according to the first set of spray parameters in Block S135.

This variation method S100 further includes, during a second time interval after the first time interval: triggering the depth sensor to capture a second depth value at the set of defined target locations on the workpiece in Block S140; for a first target location of the set of defined target locations within a first region of the workpiece, calculating a first coating thickness within the first region based on the first depth value at the first target location and the second depth value at the first target location in Block S145; in response to the first coating thickness falling below the target minimum coating thickness, defining a second set of spray parameters corresponding to a second applied coating thickness biased toward the target minimum coating thickness exceeding a first difference between the first coating thickness and the target minimum coating thickness and falling below a second difference between the first coating thickness and the target maximum coating thickness in Block S150; defining a second toolpath spanning the first region of the workpiece based on the second set of spray parameters in Block S155; and driving a set of actuators to traverse the coating applicator along the second toolpath to spray the coating onto the first region of the workpiece according to the second set of spray parameters in Block S160.

This variation further includes, during the second time interval, for a second target location of the set of defined target locations within a second region of the workpiece: calculating a second coating thickness based on the first depth value at the second target location and the second depth value at the second target location in Block S165; and, in response to the second coating thickness exceeding the target minimum coating thickness, confirming the second coating thickness and defining a keep-out region spanning the second region in Block S170.

2. APPLICATIONS

Generally, an autonomous scanning system (hereinafter the "system") can execute Blocks of the method S100 to:

access a target coating thickness range for a workpiece; define a first toolpath about the workpiece; define a first set of spray parameters corresponding to the target coating thickness range; execute a spray cycle to deposit a layer of coating onto the workpiece according to the first toolpath and the first set of spray parameters; calculate a thickness of the coating; and correct a thickness of the coating to meet the target coating thickness range by executing a second spray cycle according to a second toolpath and second spray parameters.

2.1 Depth Sensing Repeatability

The system includes high-accuracy depth sensors configured to repeatably sense depth values at the same location on the workpiece. The system detects the thickness of the coating on the workpiece by: capturing a first depth value at a depth sensing location before applying a coating; capturing a second depth value at the same depth sensing location after applying the coating; and calculating a difference between the first and second depth values. The system repeatably captures depth values at the same location by accounting for variances in the work zone between a first time at which the first depth value is captured and a second time at which the second depth value is captured. For example, the system is configured to simulate and predict vibrations of mechanical components of the system (e.g., the set of actuators configured to traverse the coating applicator) to derive an accurate location of the depth sensor, the workpiece, and the coating applicator. The system is further configured to account for changes in ambient conditions (e.g., temperature, airflow, humidity) within the work zone that may cause components of the system to expand or contract, thereby moving the depth sensor. Therefore, the system executes Blocks of the method S100 to: repeatably capture depth data at a location on the workpiece, before and after applying a coating to the workpiece; and accurately assess the thickness of the coating at that location.

2.2 Biasing Spray Parameters

The system defines a set of spray parameters corresponding to a coating thickness biased toward the target minimum coating thickness. The system biases the coating thickness toward the target minimum coating thickness to: reduce an amount of coating applied; decrease a drying time of the coating; and reduce risk of coating defects including runs and sags. While biasing the set of spray parameters toward the target minimum coating thickness may cause the system to deposit a coating below the target minimum coating thickness, the system: measures the coating thickness with high accuracy; defines a new set of spray parameters to increase the coating thickness to a thickness above target minimum coating thickness; and selectively repairs regions of the workpiece exhibiting insufficient coating thickness by executing a coating cycle according to the new set of spray parameters. Therefore, the system biases the spray parameters to: yield a layer of coating exhibiting a coating thickness proximal the target minimum coating thickness; and decrease latency and improve accuracy of the method S100.

2.3 Toolpath and Spray Parameters Tuning

The system derives a toolpath and a set of spray parameters for deposition of a layer of a coating—approximating the target minimum coating thickness—onto the workpiece. The system derives and refines the toolpath and set of spray parameters to account for: paint characteristics including transfer efficiency and recoating times; nonconstant actuation of mechanical systems (e.g., nonconstant actuation velocity of a coating applicator); and ambient conditions of the work zone including the workpiece.

The system can: derive a simulated virtual environment and a virtual model of the workpiece to depositing coating onto the virtual model representing the workpiece; and derive a toolpath and a set of spray parameters predicted to yield a layer of coating exhibiting a coating thickness exceeding the target minimum coating thickness and falling below the target maximum coating thickness.

After execution of a spray cycle (e.g., depositing the coating onto the workpiece via the coating applicator), in response to the coating thickness falling below the target minimum coating thickness, the system can derive a second toolpath and a second set of spray parameters to increase the coating thickness to a thickness within the target coating thickness range. The system derives the second toolpath and the set of spray parameters by accessing the initial simulator and refining the ambient conditions of the simulator and predicted coating characteristics based on the coating thickness of the first layer deposited onto the workpiece. The system refines the simulator until the simulation of the first toolpath and the first set of spray parameters yields a simulated coating thickness matching the actual deposited coating thickness.

The system can then: calculate an additional thickness of the coating to yield the target minimum coating thickness; input the additional thickness into the simulator; execute a simulation based on the additional thickness; and derive a second toolpath and second set of spray parameters corresponding to the additional thickness.

2.4 Calculating Coating Thickness Beyond Depth Sensing Locations

The system can calculate a thickness of the coating at each depth sensing location on the workpiece based on a difference between a first depth value at each sensing location captured before the spray cycle and a second depth value at the same depth sensing location captured after the spray cycle. The system then: refines the simulator to match a simulated thickness of coating on the virtual model at virtual depth sensing locations corresponding to the depth sensing locations on the workpiece to the actual coating thickness at the physical depth sensing locations; and calculates simulated coating thicknesses along a virtual surface of the virtual model. Therefore, based on a thickness of the coating on the workpiece at a depth sensing location, the system can predict simulated thicknesses of the coating along the entire workpiece.

3. EXAMPLE

In one implementation, the system can execute the method S100 to autonomously apply a coating to a workpiece. For example, the system can execute the method S100 to apply paint to an aircraft wing within a target coating thickness range (e.g., thicker than a target minimum coating thickness and thinner than a target maximum coating thickness). The system executes Blocks of method S100 to: scan the aircraft wing with an optical sensor to capture optical scan data of the aircraft wing; trigger a depth sensor to capture a high-accuracy depth measurement at one or more locations on the surface of the aircraft wing; and compile the scan data into a three-dimensional virtual model representing a surface contour of the aircraft wing. The system then: defines a toolpath along which to traverse a coating applicator about the workpiece to deposit the paint onto the surface of the aircraft; defines a set of spray parameters including a feed rate of the coating applicator, a flow rate of paint through a nozzle of the coating applicator, and a target offset distance between the nozzle of the coating applicator and the aircraft wing; and executes a spraying cycle to apply the paint to the aircraft wing by actuating the coating applicator to traverse the aircraft wing and spray the paint toward the surface of the aircraft wing according to the toolpath and scan parameters.

The system can then detect a thickness of the paint applied by the coating applicator by capturing a second depth measurement at one or more locations on the surface of the aircraft wing and calculating a difference between the first and second depth measurements. In response to detecting a thickness of the paint less than a target minimum coating thickness of the target coating thickness range, the system: calculates a target thickness for a second layer of the paint to meet the target coating thickness range; and defines a second set of spray parameters and a second toolpath to deposit a second coating of the paint. In response to detecting a thickness of the paint within the target coating thickness range (e.g., exceeding the target minimum coating thickness and falling below a target maximum coating thickness), the system can confirm completion of coating of the aircraft wing and initiate a coating cycle on a different workpiece. In response to detecting a thickness of the paint greater than the target maximum coating thickness, the system can flag the aircraft wing for repair and/or inspection (e.g., to detects runs or sags in the coating). Therefore, the system autonomously applies a coating within the target coating thickness range to the aircraft wing.

4. SYSTEM

In one implementation shown in FIG. 1, the system includes: a robotic arm arranged in or adjacent a work zone and including a set of articulatable joints interposed between a series of arm segments; an end effector supported on a distal end of the robotic arm; an optical sensor (e.g., a laser scanner) arranged on or integrated into the end effector and configured to capture optical images (e.g., depth maps) of a workpiece; a depth sensor configured to output signals corresponding to depth measurement values such as to capture the position of a workpiece in the work zone; a coating applicator arranged on or integrated into the end effector configured to spray a coating onto a workpiece arranged within the work zone; a position sensor configured to output signals representing (or assemblable into) a three-dimensional position of the optical sensor; a display configured to render a user interface accessible by an operator; and/or a controller to execute Blocks of the method S100.

In this implementation, the system can also include a conveyor configured to traverse the robotic arm longitudinally along the work zone, such as to reach and process an elongated part defining a high length-to-width ratio (e.g., a high aspect ratio), such as a boat hull or aircraft wing.

In one implementation, an optical sensor: projects a laser (e.g., a spot, line, array of points) onto the workpiece; captures scan data of the laser projection on the surface of the workpiece; and derives a surface contour of the workpiece based on distortions of the laser projection on the surface of the workpiece.

The system includes a position sensor configured to detect a position of the optical sensor. For example, the system: includes a one-, two-, or three-dimensional LIDAR sensor, a time-of-flight distance sensor, a stereoscopic camera, a depth sensor, and/or color camera, etc. arranged facing the robotic arm to detect a position of the optical sensor. The system can access one-dimensional distances or two- or three-dimensional images output by these sensors; and can derive and track three-dimensional positions of the optical sensor along the track.

In another implementation, the conveyor and the joints of the robotic arm can include positional encoders (e.g., magnetic encoders configured to output a signal corresponding to a position of the robotic arm on the conveyor or the angular position of the joint of the robotic arm. The system can compile the set of encoder signals to derive a position of the end effector and the optical sensor. However, the system can implement any other method or technique to track three-dimensional positions of the robotic arm, optical sensor, and/or a reference point during a scanning or processing cycle.

In one implementation, the system includes a controller. The controller can, for example: trigger actuators of the system to traverse the optical sensor proximal the workpiece and capture scan data to complete a scan; trigger actuators of the system to traverse the coating applicator about the workpiece according to a toolpath and spray parameters; trigger the depth sensor to capture a depth measurement value; and compile the scan data into a virtual model of the workpiece. The controller is further configured to execute any of the Blocks of the method S100 described herein.

In one implementation, the system can locate and articulate the end effector according to the method described in U.S. patent application Ser. No. 18/232,275.

4.1 Optical Sensor

The system includes an optical sensor (e.g., a laser scanning sensor) operable to capture scan data of a workpiece loaded into the work zone. In one implementation, the system actuates the optical sensor and captures scan data via the optical sensor according to a set of scanning parameters. The set of scanning parameters can include: a scan path; an orientation of the optical sensor; an actuation velocity of the optical sensor; a frequency (e.g., a color) of light emitted by the optical sensor toward the workpiece; an exposure; a sample area; a sampling density; and active area/spot selection.

In one implementation, the optical sensor defines a laser line scanner configured to emit a laser toward the workpiece. The optical sensor can capture light reflected from the workpiece back to the optical sensor and can generate a signal (e.g., scan data) representing a distance between the workpiece and the optical sensor. For example, the optical sensor can emit a laser toward the workpiece; capture a portion of the light from the laser reflected by the workpiece; and output a signal representing a distance between the workpiece and the optical sensor with an error of two to five millimeters. The system can therefore: traverse the optical sensor about the workpiece to capture a set of scan data; and assemble the set of scan data into a virtual model representing the workpiece with a dimensional accuracy of +/−2.0 millimeters.

4.2 Depth Sensor

The system includes a depth sensor configured to output a signal representing a distance (e.g., a depth) between optical sensor and the workpiece. In one implementation, the depth sensor is configured to capture depth measurements at one or more locations on the workpiece exhibiting an error of approximately ten thousandths of an inch (e.g., "ten mils") or approximately one quarter of a millimeter.

In one implementation, the depth sensor is a time-of-flight sensor configured to: emit light (e.g., infrared light) into the work zone toward the workpiece; capture light reflected back to the depth sensor; and output a signal representing a time-of-flight of the light and therefore a distance between the depth sensor and the location on the workpiece. However, the system can execute the Blocks of the method S100 with any other type of depth sensor including but not limited to contactless sensors such as structured light sensors, stereo sensors, and LiDAR sensors.

In one implementation, the system includes one or more depth sensors mounted at stationary positions throughout the work zone and oriented toward the work zone. For example, the work zone can include a set of three depth sensors mounted above a work zone, at three separate locations. The system can trigger each depth sensor of the set of three depth sensors to capture a depth measurement at the same location on the surface of the workpiece. The system can then access the three depth measurements for the location on the surface of the workpiece captured by the three depth sensors and derive a high-accuracy depth value by triangulating the three measurements. Therefore, the system can: include one or more stationary depth sensors; and capture depth measurements of the workpiece.

In another implementation, the system includes one or more depth sensors arranged on or integrated into the end effector. For example, the system can configure a depth sensor arranged on the end effector to capture depth data while the robotic arm traverses the end effector about the workpiece. Therefore, the system simultaneously captures: a timeseries of depth data via the depth sensor; and a timeseries of scan data via the optical sensor captures. In this example, the system can detect a location of the depth sensor associated with a particular depth datum based on time stamps on the timeseries of depth data and the timeseries of scan data.

4.3 Coating Applicator

The system includes a coating applicator configured to dispense a coating onto the workpiece. In one implementation, the coating can include a primer, paint, or a gel. The coating applicator includes: a pressurized vessel containing a volume of the coating; and a nozzle coupled to the pressurized vessel configured to direct the coating toward the workpiece. In one implementation, the nozzle of the coating applicator is interchangeable with a set of nozzles including a fan nozzle, a conical nozzle, and a linear nozzle to manipulate the geometry of the coating output by the nozzle. In one implementation, the coating applicator is integrated into the end effector or otherwise mounted to the robotic arm and actuatable via a set of actuators.

The coating applicator applies the coating onto the workpiece according to a set of spray parameters including: a flowrate of coating through the nozzle; a feed rate of the coating applicator about the toolpath; and a target offset distance between the nozzle of the coating applicator and the surface of the workpiece.

5. TARGET PAINT THICKNESS

The method S100 includes accessing a target minimum coating thickness and a target maximum coating thickness (e.g., a target coating thickness range) for a coating applied to a workpiece in Block S105. In one implementation, the system can prompt an operator of the system to input the target coating thickness range. In another implementation, the system can derive the target coating thickness range based on the workpiece or type of coating. For example, for a stainless steel workpiece, a manufacturer may specify a target coating thickness of five mil, plus or minus a range of two mil. The system can access the manufacturer specification associated with the workpiece to define the target coating thickness range of three to seven mil.

In one implementation, system can define the target minimum coating thickness and the target maximum coating thickness as a dry film thickness corresponding to a thickness of the coating after the coating cures (e.g., dries). The system can therefore: access a target minimum dry film thickness; access a target maximum dry film thickness; access a coating thickness function defining a conversion of wet coating thickness to dry coating thickness based on an elapsed time since application of the coating; and store a first time corresponding to application of coating within the first region during the first time interval. The system can further calculate the first coating thickness by: calculating a wet coating thickness within the first region based on a difference between the first depth value and the second depth value; and converting the wet coating thickness to a final dry film thickness based on the coating thickness function and the first time.

In one implementation, the system can additionally access a minimum application thickness defining a minimum thickness of the coating to deposit onto a surface to enable the coating to properly cure. For example, a manufacturer specification for a particular coating can specify a minimum application thickness of two mil indicating that the coating applicator apply at least two mil of the coating to the surface of the workpiece per coating cycle to yield a contiguous layer of the coating.

6. OPTICAL SCAN

In one implementation, the method S100 includes: triggering an optical sensor, traversing a workpiece, to capture a first set of scan data representing the workpiece in Block S110; and assembling the first set of scan data into a first virtual model representing a surface contour of the workpiece in Block S115. The system can therefore execute Blocks S110 and S115 by: navigating an end effector over a workpiece; accessing a set of images captured by an optical sensor arranged on the end effector while traversing the workpiece; and compiling the set of images into a virtual model representing unloaded surfaces of the workpiece. Generally, the system can implement methods and techniques described in U.S. patent application Ser. No. 18/111, 470 to: autonomously navigate an optical sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a wide dimensional tolerance (e.g., +/−0.15").

For example, after an operator loads the workpiece into the work zone and confirms processing limits for the workpiece, the system can initiate a scan cycle. During the scan cycle, the system can: navigate the optical sensor—located on the end effector—along the scan path over and offset above the workpiece; monitor a distance between the end effector and the workpiece based on scan data collected by the optical sensor; and implement closed-loop controls to maintain a target offset distance between the optical sensor and the workpiece (e.g., 20", 50 centimeters). The system can actuate a gantry or conveyor supporting the robotic arm to traverse the robotic arm along the longitudinal axis of the work zone while actuating the end effector and the optical sensor laterally across the work zone to capture a sequence of optical images representing all surfaces of the workpiece accessible by a sanding head on the end effector.

The system can thus capture scan data—such as color photographic images, stereoscopic images, depth maps, and/ or LIDAR images—from a set of optical sensors arranged on the end effector while traversing the end effector across (e.g., over, and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system can then compile these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and optical sensor over the workpiece, to collect optical images of the workpiece, and to generate a virtual three-dimensional model of the workpiece based on these optical images.

The system can therefore execute Blocks of the method S100 to: autonomously capture scan data of a workpiece occupying a work zone during a contactless scan cycle; compile these scan data into a virtual three-dimensional model; and generate a toolpath spanning surfaces of the workpiece represented in the virtual model.

7. DEPTH SENSING

In one implementation, the method S100 includes triggering a depth sensor to capture a first depth value at a first location on the workpiece in Block S120.

In one implementation, in order to decrease a computational complexity and latency of the method S100, the system can trigger the depth sensor to capture depth measurements at a single location on the workpiece. The depth sensor can capture depth measurements of the workpiece independently or dependently of the surface contour of the workpiece. For example, a stationary depth sensor may exhibit a set orientation such that the depth sensor captures a depth measurement of the workpiece at a single depth measurement location. In this example, an operator may confirm during loading of the workpiece into the work zone that the workpiece is located within a region of the work zone that includes the location of the depth sensing measurement. In this example the depth sensing location is independent of the surface contour of the workpiece.

In another example, a stationary depth sensor or depth sensor coupled to the end effect can capture a depth measurement at a location on the workpiece associated with a coating failure risk region. A coating failure risk region may include a surface feature of the workpiece identified to likely exhibit a paint thickness over the target maximum coating thickness or a coating thickness less than the target minimum coating thickness. For example, surface features of the workpiece that include downward slopes can include a thin coating failure risk region at a local maximum of the downward slope where a coating is likely to drip down the surface and away from the local maximum. Another surface feature that defines a thick coating failure risk region can include a local minimum where the coating is likely to pool. Therefore, the system can: based on the virtual model of the surface contour of the workpiece, identify a location exhibiting a coating failure risk; and set the target depth sensing location of the depth sensor to the location exhibiting the coating failure risk.

In one implementation, the system can detect a point on the surface of the workpiece closest to the depth sensor and select that point as the target depth sensing location. Therefore, the system minimizes an error of the depth sensor by decreasing a range over which the depth sensor functions.

In one implementation, in order to increase an accuracy of the method S100, the system can trigger the depth sensor to capture depth measurements at a set of multiple depth sensing locations along the surface of the workpiece. The system can select the set of depth sensing locations independently or dependently of the surface contour of the workpiece representing in the virtual model. For example, the system selects the set of depth sensing locations by projecting a randomized array of points onto the workpiece, each point of the randomized array defining a depth sensing location.

In another implementation, the system can capture depth measurements at a set of multiple depth sensing locations based on a coating failure risk regions of the workpiece. For example, triggering the depth sensor to capture the depth value at a first target location can include selecting a first target location, within a first region on the workpiece, based on the surface contour of the workpiece by: detecting an upward-facing maxima represented in the virtual model; associating the upward-facing maxima represented in the virtual model with a risk of wet coating migration away from the upward-facing maxima and reduced coating thickness; defining the first target location, on the workpiece, proximal the upward-facing maxima represented in the virtual model; and defining the first region of the workpiece containing the first target location.

The system can then capture a depth measurement at a second depth sensing location associated with a different coating risk. For example, the system can select a second target location by: detecting a downward-facing edge represented in the virtual model; associating the downward-facing edge represented in the virtual model with risk of wet coating migration toward from the downward-facing maxima and increased coating thickness; defining the target location, on the workpiece, proximal the downward-facing edge represented in the virtual model; and defining a second region of the workpiece containing the second target location.

8. INFORMATION AGGREGATION

The method S100 includes: defining a first set of spray parameters corresponding to a first applied coating thickness biased toward the target minimum coating thickness based on initial ambient conditions within a work zone containing the workpiece and predicted coating characteristics in Block S125; and defining a first toolpath based on the surface contour of the workpiece represented in the virtual model, the initial ambient conditions within the work zone containing the workpiece, and the predicted coating characteristics in Block S130.

In Blocks S125 and S130, the system aggregates a set of conditions including: ambient conditions; and coating characteristics. The system can access ambient conditions including environmental conditioning, such as by accessing an environmental database (e.g., a third-party weather API) or querying a set of environmental sensors (e.g., temperature and/or humidity sensors in the work zone). The ambient conditions can include: a temperature within the work zone; a temperature of the workpiece; a humidity in the work zone; and airflow within the work zone. Each of the ambient conditions can affect the coating characteristics (e.g., transfer efficiency, viscosity) as the coating is dispensed by the coating applicator. For example, in a high temperature (e.g., 90° F.) and high humidity (e.g., 90%) environment, the viscosity of a coating may decrease and exhibit a lower transfer efficiency.

The system can thereby: capture a depth value at a depth sensing location on the workpiece before the first spray cycle; access ambient conditions of the work zone during the first spray cycle; capture a depth value at the same depth sensing location after the first spray cycle; calculate a thickness of the coating at the depth sensing location based on the depth values; calculate a transfer efficiency of the coating based on the thickness and an amount of coating dispensed; and derive a relationship between transfer efficiency and the ambient conditions during the first spray cycle. The system can then: access ambient conditions during a second spray cycle (e.g., a repair cycle to deposit additional coating); predict a transfer efficiency of the second spray cycle based on the relationship between transfer efficiency and ambient conditions; and derive a second set of spray parameters and second toolpath predicted to yield a target coating thickness based on the second spray cycle transfer efficiency.

The system can additionally access a set of coating characteristics by: accessing a coating identifier; accessing a coating characteristic database; and identifying a set of coating characteristics associated with the coating identifier. The system can access coating characteristics including: a nominal transfer efficiency of the coating; a nominal coating viscosity; and a target overlap.

In one implementation, accessing the predicted coating characteristics includes: calculating a transfer efficiency of the coating based on the ambient temperature and the humidity within the work zone, the transfer efficiency defining a proportion of the coating, sprayed by the coating applicator, that affixes to the workpiece. Then, the system defines the first set of spray parameters by: based on the transfer efficiency, defining a first pressure within the coating applicator, a first feed rate of the coating applicator, and a first offset distance between the coating applicator and the workpiece corresponding to depositing a first coating exhibiting a first thickness exceeding the target minimum coating thickness and falling below the target maximum coating thickness on the workpiece.

9. TOOLPATH+SPRAY PARAMETER CALCULATION

In one implementation, the method S100 includes: defining a first set of spray parameters in Block S125; and defining a first toolpath based on the first set of spray parameters and the surface contour of the workpiece represented in the virtual model in Block S130.

The spray parameters define: a feed rate (e.g., a velocity of actuation) of the coating applicator along the toolpath by a set of actuators; a flowrate of the coating out of the nozzle of the coating applicator; and a target offset distance between the nozzle of the coating applicator and the surface of the workpiece. The toolpath defines a trajectory along which the set of actuators traverses the coating applicator to deposit a coating onto the surface of the workpiece.

9.1 Spray Parameters

In one implementation, the system defines a set of spray parameters corresponding to a coating thickness biased toward the target minimum coating thickness. For example, the system can: access the target minimum coating thickness; input the target minimum coating thickness into a coating model relating spray parameters to a yielded coating thickness; and identify a set of spray parameters that yields a coating thickness greater than or equal to the target minimum coating thickness.

The system defines the first set of spray parameters by: identifying a first feed rate to traverse the coating applicator along the first toolpath about the workpiece; identifying a first flow rate of the coating exiting a nozzle of the coating applicator; and identifying a first offset distance between the nozzle of the coating applicator and the workpiece. The system defines the first feed rate, first flow rate, and the first offset distance to yield a layer of the coating on the workpiece exceeding the target minimum coating thickness and falling below the target maximum coating thickness.

In one implementation, the system can define the set of spray parameters by: rendering the virtual model representing the workpiece within a virtual environment; simulating the coating applicator spraying a simulated coating onto a first simulated region of the workpiece according to a first set of simulated spray parameters including a first feed rate, a first flow rate, and a first offset distance; calculating a first thickness of the simulated coating of the first region of the workpiece falling below the target minimum coating thickness; simulating the coating applicator spraying the simulated coating onto a second region of the workpiece according to a second set of simulated spray parameters including a second feed rate, a second flow rate, and a second offset distance; calculating a second thickness of the simulated coating of the second region of the workpiece exceeding the target maximum coating thickness; and defining a first set of spray parameters defining a third feed rate less than the first feed rate and greater than the second feed rate, the first flow rate, and the first offset distance. Therefore, the system can generate simulated spray cycles and simulate the coating thickness yield of a particular set of simulated spray parameters on the virtual model. Then system then selects a set of spray parameters based on the set of simulated spray parameters corresponding to a simulated coating thickness within the target coating thickness range.

9.2 Toolpath

The toolpath defines the trajectory along which a set of actuators actuates the coating applicator while the coating applicator applies the coating onto the workpiece.

In one implementation, the system can: define a serpentine or boustrophedonic toolpath within a region of the workpiece according to a nominal stepover distance; and store this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece. The system can repeat this process for each other region of the workpiece.

Alternatively, the system can implement the foregoing methods and techniques to generate a single continuous toolpath spanning the entire workpiece (or an entire surface of the workpiece selected for autonomous processing by the system).

In one implementation, the system can generate the first toolpath by: defining the first toolpath including a first ordered sequence of keypoints located on the third virtual model; and, for each keypoint in the first ordered sequence of keypoints, calculating a vector normal to the third virtual model at a location of the keypoint on the third virtual model and storing the vector in the keypoint. The system navigates the sanding head across the first workpiece region according to the first toolpath and deviates the sanding head from the first toolpath by: for a first keypoint in the first ordered sequence of keypoints, via the set of actuators, locating the sanding head at a first position intersecting the first keypoint and aligning an axis of the sanding head to a first vector contained in the first keypoint; and driving the sanding head, coaxial with the first vector, toward the workpiece to match force values, in the first sequence of force values read from the force sensor to the nominal target force.

The system can further implement methods and techniques described in U.S. patent application Ser. No. 18/111, 470 to define a toolpath of the end effector along the workpiece.

9.2.1 Toolpath Based on Contour of Workpiece

In one implementation, the system defines a toolpath based on a surface contour of the workpiece represented in the virtual model. The system can: capture scan data of the workpiece via the optical sensor; compile the scan data into a virtual model of the workpiece; detect a geometry of the surface contour of the workpiece based on the virtual model; and define the toolpath approximating the geometry of the surface contour of the workpiece (e.g., for a sloped linear workpiece surface defining a first slope, the system defines a sloped linear toolpath exhibiting a second slope equal to the first slope of the workpiece and offset by a target offset distance from the workpiece).

For example, for a hemispherical workpiece, the system: captures a set of scan data via the optical sensor; compiles the scan data into a virtual model of the workpiece representing the hemispherical surface contour of the workpiece; and defines a toolpath including a set of boustrophedonic hemi-circular arcs offset by the target offset distance from the workpiece surface. The system therefore: defines the toolpath corresponding to the geometry of the surface contour of the workpiece; and maintains the coating applicator at an approximately constant offset distance from the surface of the workpiece according to the toolpath.

The system can additionally: detect a set of surface normal vectors of the workpiece; assign each surface normal vector to a keypoint of the toolpath; and define the toolpath to orient the coating applicator normal to the surface of the workpiece at each keypoint of the toolpath. Therefore, the system can: orient the coating applicator relative to the workpiece; and maintain the coating applicator and the nozzle of the coating applicator normal to the surface of the workpiece. For a workpiece exhibiting sharp edges (e.g., sudden changes in slope of the surface contour of the workpiece), the system can: define an initial toolpath matching the surface contour of the workpiece; and refine the initial toolpath to define a toolpath exhibiting smooth transitions between multiple coating applicator orientations about the sharp edges of the workpiece.

In one implementation, defining the toolpath includes: detecting a relative area of a region of the workpiece to define the target offset distance corresponding to the region. For example, for a region of the workpiece defining a long, narrow geometry (e.g., two feet long by three inches wide), the system can: define a segment of the toolpath to actuate the coating applicator parallel to the longitudinal axis of the region. Within the segment of the toolpath, the system sets an offset distance between the nozzle of the coating applicator and the workpiece surface corresponding to a width of a fan of coating output by the nozzle approximating the width of the region. For example, for the three inch wide region, the system can define a first offset from the surface of the workpiece corresponding to the coating contacting the workpiece in an approximately three-inch wide fan. For a six-inch wide region, the system can define a second offset distance greater than the first offset distance such that the fan of the coating output from the nozzle of the coating applicator contacts the surface of the workpiece with an approximately six-inch fan width. Therefore, to increase the width of the fan of coating contacting the surface of the workpiece, the system increases the offset distance between the workpiece and the coating applicator nozzle.

9.2.2 Target Overlap

The system can define the toolpath for the coating applicator to traverse the workpiece based on a target overlap of the coating. The target overlap defines a proportion of a fan of coating sprayed by the nozzle of the coating applicator onto a first region of the workpiece that overlaps with a fan of coating sprayed by the coating applicator onto a second region of the workpiece adjacent to the first region.

In one implementation, the system drives the set of actuators to traverse the coating applicator along the first toolpath by actuating the coating applicator along the path to each key point of the set of keypoints. The system defines the first toolpath by: predicting a width of a fan of coating expelled from a nozzle of the coating applicator at a location contacting a surface of the workpiece based on a nozzle geometry of the application and the target offset distance; accessing a target spray overlap; and defining the first toolpath to approximate the target spray overlap based on the width of the fan of coating.

For example, the system can: access a target coating overlap of 50% indicating that the fan of coating from the coating applicator along each segment of a boustrophedonic toolpath overlaps 50% with a previous segment of the boustrophedonic toolpath and 50% with a next segment of the boustrophedonic toolpath.

9.3 Toolpath and Spray Parameter Tuning

The system defines: a toolpath including a trajectory of the coating applicator about the workpiece at a target offset distance; and a set of spray parameters including a flowrate of coating through the nozzle of the coating applicator and a feed rate of the coating applicator along the toolpath. The system predicts a thickness of the coating according to the toolpath and the spray parameters.

The system additionally predicts a thickness of the coating deposited onto the workpiece by the coating applicator according to coating characteristics (e.g., transfer efficiency) and ambient conditions (e.g., temperature, humidity, air flow). The system refines the set of spray parameters and toolpath to account for the coating characteristics and ambient conditions to yield a coating corresponding to the target coating thickness range.

In one implementation, the system defines the toolpath by: initializing a virtual environment approximating the work zone; populating the virtual environment with the virtual model of the workpiece; accessing the initial ambient conditions; accessing the predicted coating characteristics; projecting a first toolpath onto the virtual model within the virtual environment; calculating a set of predicted thicknesses of the coating applied to the workpiece by simulating application of the coating to the virtual model within the virtual environment based on the initial ambient conditions, the predicted coating characteristics, and the first set of spray parameters; and adjusting the first set of spray parameters and the first toolpath to reduce a difference between the set of predicted thicknesses and the target minimum coating thickness. Therefore, the system can: simulate a toolpath within a virtual environment; iteratively refine the toolpath within the simulator; and generate the toolpath corresponding to the target minimum coating thickness.

In one implementation, the system additionally accounts for variability of: the mechanical system actuating the coating applicator about the toolpath; and the ambient conditions. For example, the system can: predict a curing time of the coating based on the temperature and humidity within the work zone; predict a transfer efficiency or a proportion of atomization of the coating based on the coating characteristics and the ambient conditions; predict an acceleration of the coating applicator along the toolpath due to changes in slope of the toolpath (e.g., increasing velocity/positive acceleration along downward sloped segments of the toolpath and decreasing velocity/negative acceleration along upwardly sloped segments of the toolpath); and refine the toolpath and spray parameters to yield a consistent thickness of the coating across the surface of the workpiece. For example, the system accounts for each of the above variabilities by refining the spray parameters and toolpath to change the offset distance for a segment of the toolpath, such as to actuate the coating applicator to a decreased offset distance from the workpiece for a segment exhibiting an increased velocity or decrease a feed rate of the coating applicator proximal the segment of predicted increased velocity. Furthermore, the system can simulate the toolpath and spray parameters to predict a coating thickness. For a predicted coating thickness below the target minimum coating thickness, the system can refine the toolpath to decrease the offset distance and/or refine the spray parameters to reduce the feed rate of the coating applicator or reduce the flowrate of the coating through the nozzle of the coating applicator. For a predicted coating thickness above the target maximum coating thickness, the system can refine the toolpath to increase the offset distance and/or refine the spray parameters to increase the feed rate and/or flow rate.

10. AUTONOMOUS PAINT APPLICATION

Once the system defines the first toolpath and the first set of spray parameters, the system can drive a set of actuators to traverse the coating applicator along the first toolpath to spray the coating onto the workpiece according to the first set of spray parameters in Block S135.

For example, the system drives the set of actuators to traverse the coating applicator to each keypoint of a set of keypoints defining the toolpath and maintains the coating applicator the offset distance from the surface of the workpiece. The system drives the set of actuators to traverse the coating applicator at the feed rate of the set of spray parameters. The system further activates a pump to pressurize an internal volume of the coating applicator to a target internal pressure corresponding to the flowrate specified in the set of spray parameters.

In one implementation, traversing the coating applicator about the toolpath includes actuating the coating applicator along five axes of articulation, such as to vary the orientation of the nozzle of the coating applicator to maintain the nozzle of the coating applicator normal to the surface of the workpiece. The system can additionally interpolate between keypoints of a toolpath and smoothly transition the coating applicator from a first set of spray parameters to a second set of spray parameters based on the keypoint currently occupied by the coating applicator.

Therefore, the system: executes a spray cycle by traversing the coating applicator about the workpiece; and deposits a coating onto the surface of the workpiece.

11. SECOND DEPTH SENSING

The method S100 further includes, during a second time interval succeeding the first time interval: triggering the depth sensor to capture a second depth value at the first target location in Block S140.

12. APPLIED COATING THICKNESS DETECTION

The system calculates a first coating thickness of the workpiece based on the first depth value and the second depth value in Block S145. The coating thickness defines a measure of the amount of coating deposited onto the surface of the workpiece by the coating applicator after one or more spray cycles. The system calculates the coating thickness for a spray cycle by calculating a difference between a current depth value captured by the depth sensor after the spray cycle and a previous depth value captured before the spray cycle. The system can calculate a total coating thickness of the workpiece after multiple spray cycles (e.g., after multiple layers of coating) by calculating a difference between an initial depth value before a first spray cycle and a current depth value.

The system can further predict a dry film thickness of the coating based on an elapsed time since the coating was applied and a current coating thickness. For example, immediately after executing a spray cycle, the system can: trigger the depth sensor to capture a depth value; calculate a current wet coating thickness; access coating characteristics including a proportion of solvent in the coating; predict a proportion of evaporation of the solvent per since the coating was applied; and therefore predict timeseries of thicknesses until the coating cures to the final dry film thickness.

In one implementation, the system can sense depth values at multiple locations along the workpiece. For example, the system can trigger the depth sensor to capture a set of depth values at an array of depth sensing locations, each depth sensing location offset from another depth sensing location by an equal pitch offset (e.g., one depth sensing location for every six inches of length of the part). The system can: compile the set of depth values into a three-dimensional mesh; and interpolate depth values along the mesh between depth sensing locations to define an average coating thickness of the workpiece and/or the coating thickness at specific locations on the workpiece.

12.1 Simulation Refinement

Based on the coating thickness, the system can update a coating simulator (e.g., a virtual environment representing the work zone configured to simulate spray cycles according to simulated spray parameters and simulated toolpaths about the virtual model representing the workpiece) of the coating application to the workpiece to reflect actual ambient conditions.

The system can calculate a thickness of the coating at each depth sensing location on the workpiece based on a difference between a first depth value at each sensing location captured before the spray cycle and a second depth value at the same depth sensing location captured after the spray cycle. The system then: refines the simulator to match a simulated thickness of coating—on the virtual model at virtual depth sensing locations corresponding to the depth sensing locations on the workpiece—to the actual coating thickness at the physical depth sensing locations; and calculates simulated coating thicknesses along a virtual surface of the virtual model. Therefore, the system: simulates coating thicknesses at virtual depth sensing locations on the virtual model corresponding to the actual depth sensing locations on the workpiece; and triggers the simulator to simulate coating thickness at the virtual depth sensing locations matching the actual coating thickness at the depth sensing locations.

After refining the simulator, (e.g., by refining the virtual environment, simulated coating characteristics, etc.), the system can: interpolate the coating thicknesses at the virtual depth sensing locations; and predict a set of simulated coating thicknesses at additional locations on the virtual model. Therefore, based on a thickness of the coating on the workpiece at a depth sensing location, the system can predict simulated thicknesses of the coating along the entire surface of the workpiece.

Figure 2:
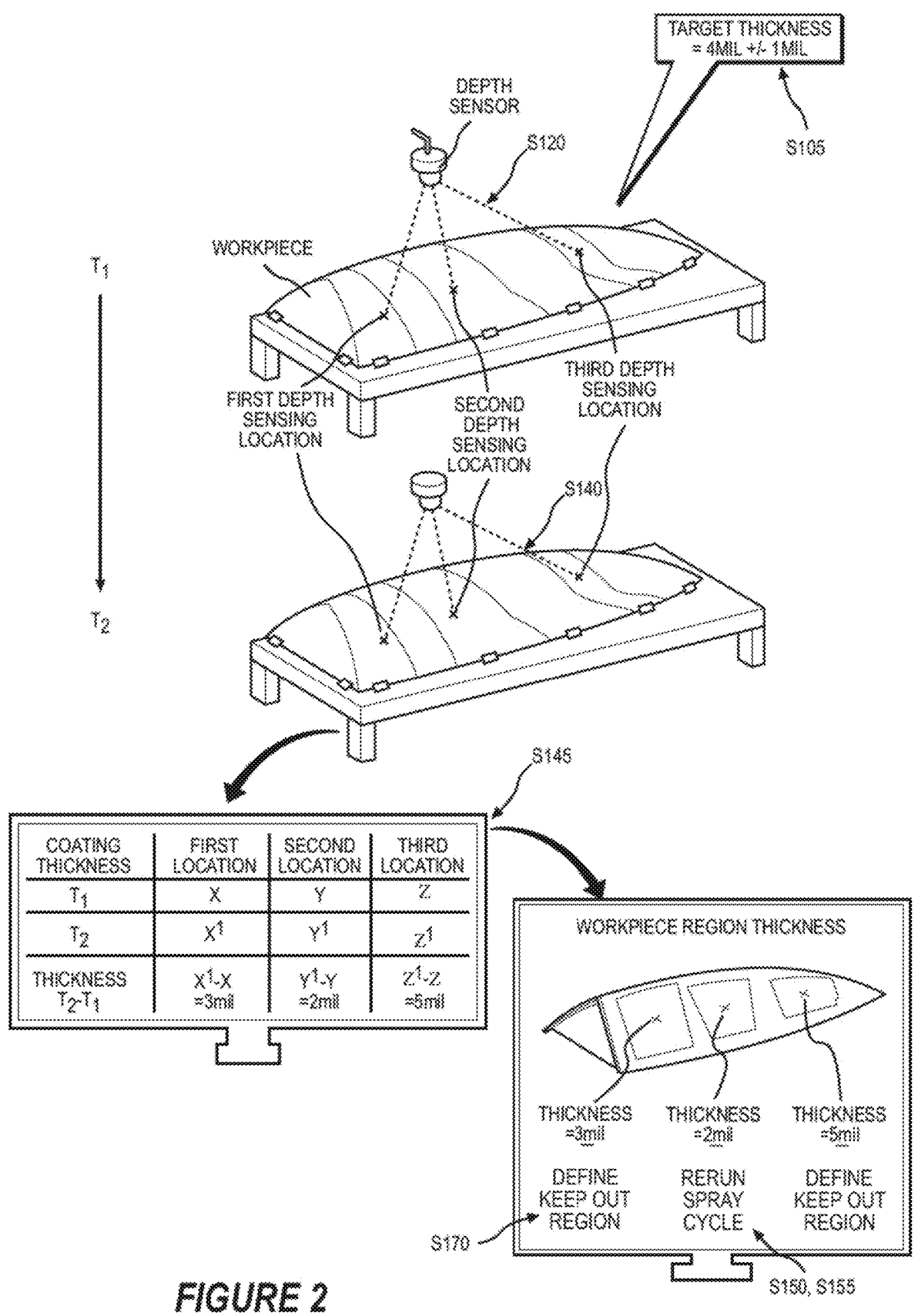
FIG. 2 is a representation of one variation of the method.
Figure 3A:
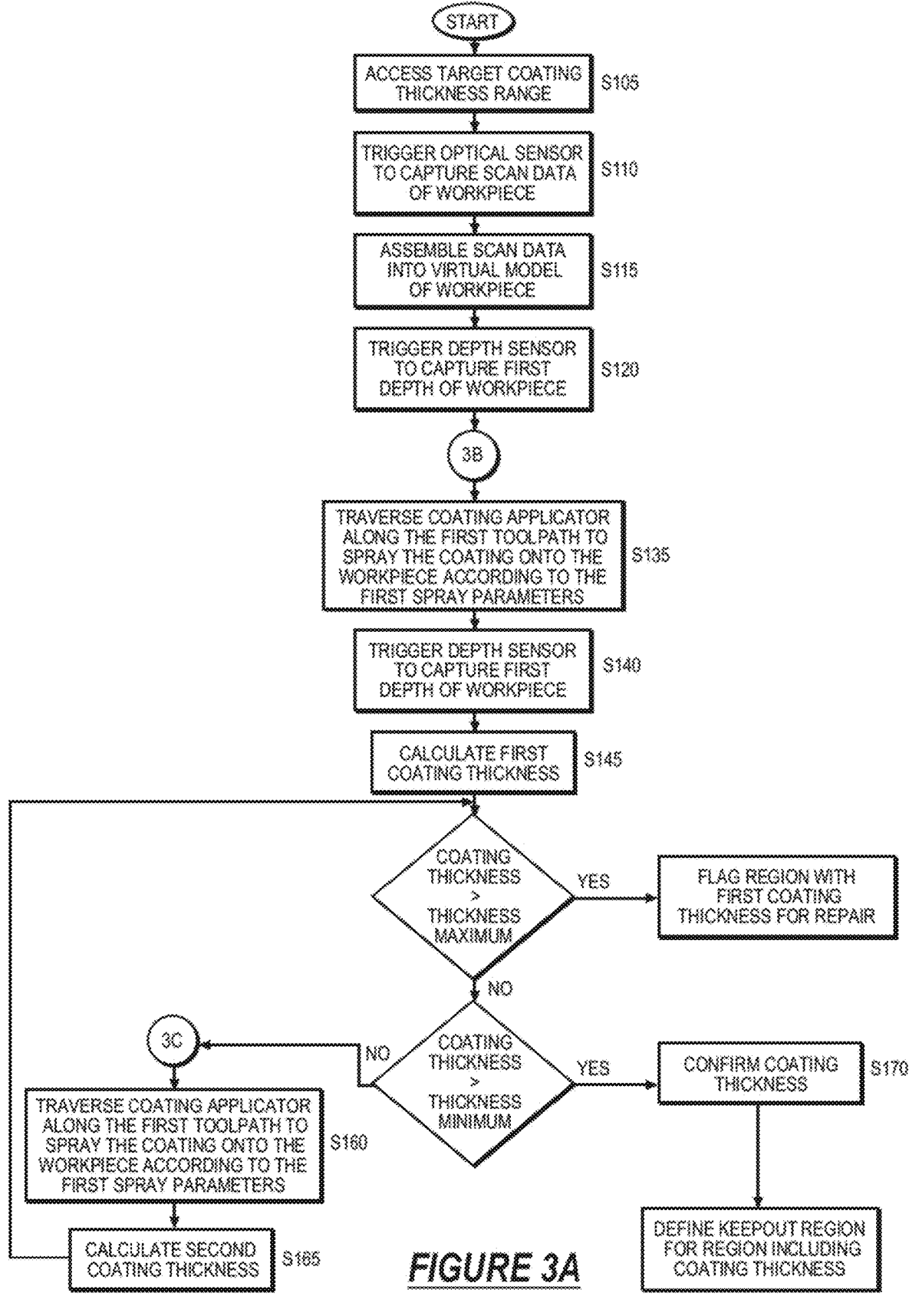
FIG. 3A is a representation of one variation of the method.

Further, as shown in FIG. 2, the system can segment the surface of the workpiece into regions based on the predicted simulated thickness of the region. For example, after calculating predicted thicknesses at hundreds or thousands of locations on the virtual model, the system: interpolates the predicted thickness; generates a mapping of thicknesses for the virtual surface of the virtual model corresponding to thicknesses of the coating on the surface of the workpiece; segments the mapping of thicknesses into regions including a) regions exhibiting insufficient coating thicknesses (e.g., below the target minimum coating thickness), b) regions exhibiting sufficient coating thicknesses (e.g., within the target coating thickness range), and c) regions exhibiting a coating thickness exceeding the target maximum coating thickness. The system can: define approximate boundaries for each of the regions; generate a second set of spray parameters and second toolpath for regions exhibiting insufficient coating thickness; generate a keep-out region including an instruction for the second toolpath to avoid the region exhibiting sufficient coating thickness; and generate a notification to an operator indicating a flag for repair of the region exhibiting coating thickness exceeding the target maximum coating thickness.

Therefore, the system can: iteratively tune (e.g., modify) a simulator of coating application to the workpiece; converge on a simulator that accurately represents the work zone, coating application, and the workpiece; and accurately predict the coating thickness of the entire surface of the workpiece based on a toolpath and a set of spray parameters.

13. COATING THICKNESS CORRECTION

The system can calculate an amount of coating to deposit in a second or subsequently spray cycle based on the target coating thickness range (e.g., target minimum coating thickness) and target maximum coating thickness) and the current coating thickness.

In one implementation, the system calculates a target second (or subsequent) coating thickness based on a difference between the current coating thickness and a target minimum coating thickness. In response to the current coating thickness falling below the target minimum coating thickness, the system: defines a second set of spray parameters corresponding to a target second coating thickness wherein the target second coating thickness and the first coating thickness yield a total coating thickness within the target coating thickness range.

In one implementation, the system defines the second toolpath as a segment of the first toolpath. For example, the system can: detect a region of the workpiece exhibiting a coating thickness below a target minimum coating thickness; access a segment of the first toolpath corresponding to the region of the workpiece; and define the second toolpath as the segment of the first toolpath to apply an additional layer of coating to the region.

13.1 Second Spray Parameters

After executing a spray cycle and detecting the coating thickness falling below the target minimum coating thickness, the system defines a second set of spray parameters to increase the total coating thickness to exceed the target minimum coating thickness.

In one implementation, the system can access the minimum dry film thickness defining a minimum thickness of the coating required for the coating to bond and/or form a contiguous layer across the surface of the workpiece. The system thereby defines the second set of spray parameters by: accessing a minimum dry film thickness of the coating, the minimum dry film thickness less than a difference between the first coating thickness and the maximum target coating thickness; and defining the second set of spray parameters configured to deposit at least the minimum dry film thickness onto a surface of the workpiece to yield a second coating thickness exceeding a difference between the first coating thickness and target minimum coating thickness. The system can access coating characteristics including the minimum dry film thickness such as by accessing a manufacturer specification for the particular coating. The system can additionally calculate a minimum dry film thickness based on coating characteristics and ambient conditions in the work zone.

13.2 Thickness Correction Cycle

In response to the first coating thickness falling below the target minimum coating thickness, the system executes a thickness correction cycle by: triggering the set of actuators to traverse the coating applicator along the second toolpath to spray the coating onto the workpiece according to the second set of spray parameters in Block S160.

In one implementation, the system calculates a first coating thickness of the workpiece based on the first depth value and the second depth value (e.g., a difference between the first and second depth values). In response to the first coating thickness falling below the target minimum coating thickness, the system: defines a second set of spray parameters corresponding to a second applied coating thickness biased toward the target minimum coating thickness, exceeding a first difference between the first coating thickness and the target minimum coating thickness, and falling below a second difference between the first coating thickness and the target maximum coating thickness. The system further: defines a second toolpath spanning the first region of the workpiece based on the second set of spray parameters; and drives the set of actuators to traverse the coating applicator along the second toolpath to spray the coating onto the first region of the workpiece according to the second set of spray parameters.

In another implementation, in response to the coating thickness exceeding the target minimum coating thickness and falling below the target maximum coating thickness, the system: confirms the coating thickness; and defines a keep-out region spanning the second target location indicating a region not to apply additional coating to.

However, in response to the coating thickness exceeding the target maximum coating thickness, the system annotates a region of the virtual model of the workpiece corresponding to the target location with a flag for repair.

14. RECOAT WINDOW

In one variation, the system executes the method S100 according to a recoat window including in the coating characteristics.

In one implementation, in response to the first coating thickness falling below the target minimum coating thickness, the system: accesses a recoat schedule of the coating defining a first recoat window before a first elapsed time after a first layer of the coating, a second recoat window after a second elapsed time after the first layer of the coating, and a no-coat window after the first elapsed time and before the second elapsed time; identifies a window of the recoat schedule for the coating based on a current elapsed time since the first coating; in response to identifying the current elapsed time since the first coating falling during the first recoat window, generates an instruction to apply a second coating to the workpiece via the coating applicator before the first elapsed time; and in response to the current elapsed time during the no-coat window, generates an instruction to wait to apply the second coating to the workpiece via the coating applicator until after the second elapsed time during the second recoat window.

In one implementation, the system can define a schedule of spray cycles of a set of regions of the workpiece based on the recoat window. For example, the system can calculate a target surface area of the workpiece to coat, sense coating thickness, and recoat within an elapsed time defining the first recoat window. The system then segments the workpiece into a set of regions, each region defining a surface area less than or equal to the target surface area.

15. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

accessing a target minimum coating thickness and a target maximum coating thickness for a coating applied to a workpiece;

accessing a virtual model representing a surface contour of the workpiece;

accessing a first depth value at a first target location on the workpiece;

based on the virtual model, defining a first set of spray parameters predicted to yield a first target coating thickness of the coating, applied to the workpiece, biased toward the target minimum coating thickness;

applying the coating onto the workpiece based on the first set of spray parameters;

accessing a second depth value at the first target location;

calculating a first applied coating thickness within a first region of the workpiece based on the first depth value and the second depth value; and in response to the first applied coating thickness falling below the target minimum coating thickness:

defining a second set of spray parameters corresponding to a second target coating thickness less than a first difference between the first applied coating thickness and the target maximum coating thickness; and applying the coating onto the first region of the workpiece according to the second set of spray parameters.

2. The method of claim 1:

wherein accessing the virtual model representing the surface contour of the workpiece comprises:

triggering an optical sensor, arranged proximal the workpiece, to capture a first set of scan data representing the workpiece; and assembling the first set of scan data into the virtual model representing the surface contour of the workpiece;

wherein accessing the first depth value at the first target location on the workpiece comprises:

triggering a depth sensor, arranged proximal the workpiece, to capture the first depth value at the first target location on the workpiece; and wherein accessing the second depth value at the first target location comprises:

triggering the depth sensor to capture the second depth value at the first target location.

3. The method of claim 1:

wherein defining the first set of spray parameters comprises:

defining a first toolpath based on the surface contour of the workpiece represented in the virtual model;

wherein applying the coating onto the workpiece based on the first set of spray parameters comprises:

driving a set of actuators to traverse a coating applicator along the first toolpath to apply the coating onto the workpiece based on the first set of spray parameters; and wherein applying the coating onto the first region of the workpiece according to the second set of spray parameters comprises:

driving the set of actuators to traverse the coating applicator along a second toolpath to apply the coating onto the workpiece based on the second set of spray parameters, the second toolpath spanning the first region of the workpiece.

4. The method of claim 3:

wherein defining the first set of spray parameters comprises:

defining a first feed rate for traversing the coating applicator along the first toolpath about the workpiece;

defining a first flow rate of the coating through the coating applicator; and defining a first offset distance between the coating applicator and the workpiece, the first feed rate, first flow rate, and first offset distance predicted to yield a layer of the coating:

exceeding the target minimum coating thickness;

biased toward the target minimum coating thickness; and less than the target maximum coating thickness.

5. The method of claim 3:

wherein defining the first toolpath comprises:

generating a set of keypoints:

offset from a surface of the workpiece by a target offset distance; and defining a path approximating a geometry of the surface contour of workpiece; and wherein driving the set of actuators to traverse the coating applicator along the first toolpath comprises:

triggering the set of actuators to sequentially drive the coating applicator, at the target offset distance, to each keypoint of the set of keypoints along the path approximating the geometry of the surface contour of workpiece.

6. The method of claim 1:

wherein defining the second set of spray parameters corresponding to the second target coating thickness further comprises the second target coating thickness:

exceeding a second difference between the first applied coating thickness and the target minimum coating thickness; and falling below the first difference between the first applied coating thickness and the target maximum coating thickness.

7. The method of claim 1:

further comprising, prior to application of the coating onto the workpiece based on the first set of spray parameters:

selecting a second target location:

distinct from the first target location; and located within a second region of the workpiece distinct from the first region of the workpiece; and accessing a third depth value at the second target location;

further comprising, following application of the coating onto the workpiece based on the first set of spray parameters:

accessing a fourth depth value at the second target location;

calculating a second coating thickness within the second target location based on the third depth value from the fourth depth value; and wherein defining the second set of spray parameters comprises:

in response to the second coating thickness exceeding the target minimum coating thickness and falling below the target maximum coating thickness:

defining the second set of spray parameters defining application of the coating onto the first region of the workpiece and excluding application of the coating onto the second region of the workpiece.

8. The method of claim 1, wherein accessing the first depth value at the first target location on the workpiece comprises:

detecting an upward-facing maxima represented in the virtual model;

predicting a reduction in coating thickness at the upward-facing maxima due to migration of the coating proportional to a steepness of the surface proximal the upward-facing maxima; and in response to the reduction in coating thickness exceeding a threshold, queuing a depth sensor, arranged proximal the workpiece, to capture the first depth value proximal the upward-facing maxima.

9. The method of claim 1:

wherein accessing the target minimum coating thickness comprises:

accessing a target minimum dry film thickness;

wherein accessing the target maximum coating thickness comprises:

accessing a target maximum dry film thickness;

further comprising:

accessing a coating thickness function defining conversion of wet coating thickness to dry coating thickness based on an elapsed time since application of the coating; and storing a first time corresponding to application of coating within the first region of the workpiece; and wherein calculating the first applied coating thickness within the first region of the workpiece comprises:

calculating a first wet coating thickness within the first region based on a second difference between the first depth value and the second depth value; and converting the first wet coating thickness to a final dry film thickness based on the coating thickness function and the first time.

10. The method of claim 1, wherein defining the first set of spray parameters comprises:

simulating application of the coating onto the virtual model representing the workpiece according to a first set of simulated spray parameters comprising:

a first feed rate;

a first flow rate; and a first offset distance;

calculating a first simulated thickness of simulated coating of the first region of the workpiece;

simulating application of the coating onto a second region of the workpiece according to a second set of simulated spray parameters comprising:

a second feed rate;

a second flow rate; and a second offset distance;

calculating a second simulated thickness of the simulated coating of the second region of the workpiece; and in response to the first simulated thickness falling below the target minimum coating thickness and the second simulated thickness exceeding the target maximum coating thickness, defining the first set of spray parameters comprising:

a third feed rate less than the first feed rate and greater than the second feed rate;

the first flow rate; and the first offset distance.

11. The method of claim 1, further comprising:

further comprising, prior to application of the coating onto the workpiece based on the first set of spray parameters:

selecting a second target location distinct from the first target location; and accessing a third depth value at the second target location; and further comprising, following application of the coating onto the workpiece based on the first set of spray parameters:

accessing a fourth depth value at the second target location;

calculating a second coating thickness within the second target location based on the third depth value and the fourth depth value; and in response to the second coating thickness exceeding the target maximum coating thickness:

annotating a segment of the virtual model, corresponding to the second target location on the workpiece, with a flag for repair.

12. The method of claim 11, wherein the second target location comprises:

detecting a downward-facing edge represented in the virtual model;

predicted to yield wet coating migration from the downward-facing edge proportional to a steepness of the downward-facing edge; and selecting the second target location, on the workpiece, proximal the downward-facing edge represented in the virtual model.

13. The method of claim 1, wherein defining the second set of spray parameters comprises:

accessing a minimum dry film thickness associated with the coating, the minimum coating dry film less than the first difference between the first applied coating thickness and the target maximum coating thickness; and defining the second set of spray parameters configured to deposit at least the minimum dry film thickness onto the workpiece to yield a second coating thickness exceeding a second difference between the first applied coating thickness and the target minimum coating thickness.

14. The method of claim 1, wherein defining the second set of spray parameters comprises:

accessing a maximum recoat time limit following application of the coating;

in response to a current elapsed time since application of the first coating onto the workpiece falling below the maximum recoat time limit:

generating an instruction to apply a second layer to the workpiece before the first elapsed time; and in response to the current elapsed time since application of the first coating onto the workpiece exceeding the maximum recoat time limit:

generating an instruction to delay application of the second coating onto the workpiece.

15. The method of claim 1:

further comprising:

accessing a maximum recoat time limit following application of the coating; and segmenting the workpiece into a set of regions, each region defining a surface area for coating and recoating within the first recoat window, the surface area of the region selected based on the first recoat window, the set of regions comprising the first region;

wherein applying the coating onto the workpiece based on the first set of spray parameters comprises:

driving a set of actuators to traverse a coating applicator to apply the coating onto the first region of the workpiece according to the first set of spray parameters at a first time; and wherein applying the coating onto the first region of the workpiece according to the second set of spray parameters comprises:

driving the set of actuators to traverse the coating applicator within the first region to spray the coating onto the workpiece according to the second set of spray parameters at a second time, succeeding the first time by less than the maximum recoat time limit.

16. A method comprising:

accessing a target minimum coating thickness and a target maximum coating thickness for a coating applied to a workpiece;

accessing a virtual model representing a surface contour of the workpiece;

accessing a first depth value on the workpiece;

based on the virtual model, defining a first set of coating parameters predicted to yield a first target coating thickness of the coating, applied to the workpiece, biased toward the target minimum coating thickness;

applying the coating onto the workpiece based on the first set of coating parameters;

accessing a second depth value on the workpiece;

calculating a first applied coating thickness on the workpiece based on the first depth value and the second depth value; and in response to the first applied coating thickness falling below the target minimum coating thickness:

defining a second set of coating parameters corresponding to a second target coating thickness less than a difference between the first applied coating thickness and the target maximum coating thickness; and applying the coating onto the workpiece according to the second set of coating parameters.

17. The method of claim 16:

wherein defining the first set of coating parameters comprises:

defining a first toolpath based on the surface contour of the workpiece represented in the virtual model; and wherein applying the coating onto the workpiece based on the first set of coating parameters comprises:

driving a set of actuators to traverse a coating applicator along the first toolpath to apply the coating onto the workpiece based on the first set of coating parameters; and wherein applying the coating onto the workpiece according to the second set of coating parameters comprises:

driving the set of actuators to traverse the coating applicator along a second toolpath to apply the coating onto the workpiece based on the second set of coating parameters, the second toolpath spanning the workpiece.

18. The method of claim 16:

wherein defining the first set of coating parameters comprises:

defining an offset distance from a coating applicator to the workpiece;

calculating a transfer efficiency based on the offset distance;

accessing a coating flow rate of coating through the coating applicator; and calculating a feed rate of the coating applicator:

proportional to the transfer efficiency;

inversely proportional to the target minimum coating thickness; and inversely proportional to the flow rate; and wherein applying the coating onto the workpiece based on the first set of coating parameters comprises applying the coating onto the workpiece:

at the offset distance;

according to the feed rate; and at the coating flow rate.

19. A system comprising:

a robotic system:

arranged proximal a work zone; and comprising:

a spray coating applicator configured to spray a coating onto a workpiece; and a set of actuators configured to navigate the spray coating applicator within the work zone;

a controller configured to:

access a target minimum coating thickness and a target maximum coating thickness for the coating applied to the workpiece occupying the work zone;

access a virtual model representing a surface contour of the workpiece;

access a first depth value on the workpiece; and based on the virtual model, defining a first set of coating parameters predicted to yield a first target coating thickness of the coating, applied to the workpiece, biased toward the target minimum coating thickness;

wherein the robotic system is configured to:

drive the set of actuators to navigate the spray coating applicator across the workpiece; and trigger the spray coating applicator to apply the coating to the workpiece according to the first set of coating parameters;

wherein the controller is configured to:

access a second depth value on the workpiece;

calculate a first applied coating thickness on the workpiece based on the first depth value and the second depth value; and in response to the first applied coating thickness falling below the target minimum coating thickness:

define a second set of coating parameters corresponding to a second target coating thickness less than a difference between the first applied coating thickness and the target minimum coating thickness; and wherein the robotic system is configured to:

drive the set of actuators to navigate the spray coating applicator across the workpiece; and trigger the spray coating applicator to apply the coating to the workpiece according to the second set of coating parameters.

20. The system of claim 19:

wherein the robotic system further comprises a multi-link robotic arm configured to manipulate the end effector through six degrees of freedom proximal the workpiece located within the work zone;

wherein the set of actuators is configured to actuate the multi-link robotic arm; and wherein the spray coating applicator comprises an end effector arranged on a distal end of the multi-link robotic arm.

* * * * *